United States Patent
Molocher et al.

(10) Patent No.: US 6,950,563 B1
(45) Date of Patent: Sep. 27, 2005

(54) METHOD AND SYSTEM FOR RELOCATING HIDDEN OBJECTS IN IMAGES

(75) Inventors: Bernhard Molocher, Erding (DE); Karl Niederhofer, Siegertsbrunn (DE)

(73) Assignee: LFK-Lenkflugkoerpersysteme GmbH, Munich (DE)

( * ) Notice: Subject to any disclaimer, the term of this patent is extended or adjusted under 35 U.S.C. 154(b) by 0 days.

(21) Appl. No.: 09/889,831

(22) PCT Filed: Dec. 22, 1999

(86) PCT No.: PCT/DE99/04064

§ 371 (c)(1), (2), (4) Date: Nov. 7, 2001

(87) PCT Pub. No.: WO00/43955

PCT Pub. Date: Jul. 27, 2000

(30) Foreign Application Priority Data

Jan. 23, 1999 (DE) ................................ 199 02 681

(51) Int. Cl.[7] .............................................. G06K 9/64
(52) U.S. Cl. ...................... 382/278; 382/170; 382/209; 382/213; 358/501; 358/448; 358/463
(58) Field of Search .............................. 382/209, 216, 382/218, 278, 282, 284, 294, 169, 107, 213, 382/295; 358/501, 537, 538, 405, 450, 452, 358/448, 463

(56) References Cited

U.S. PATENT DOCUMENTS

| | | | |
|---|---|---|---|
| 4,802,757 A * | 2/1989 | Pleitner et al. ................. | 356/2 |
| 5,101,296 A * | 3/1992 | Bell ........................... | 359/489 |
| 5,353,030 A * | 10/1994 | Koch et al. .................. | 342/169 |
| 5,394,520 A * | 2/1995 | Hall ........................... | 345/632 |
| 5,572,602 A | 11/1996 | Naoi et al. ................... | 382/178 |
| 5,640,468 A | 6/1997 | Hsu ........................... | 382/190 |
| 5,706,362 A | 1/1998 | Yabe ........................... | 382/103 |
| 6,272,244 B1 * | 8/2001 | Takahashi et al. ........... | 382/190 |
| 6,516,087 B1 * | 2/2003 | Camus ........................ | 382/154 |
| 6,690,837 B1 * | 2/2004 | Broddin et al. .............. | 382/254 |

FOREIGN PATENT DOCUMENTS

| | | |
|---|---|---|
| DE | 36 06 009 C1 | 2/1986 |
| WO | WO 97/06631 | 8/1996 |
| WO | WO 98/18261 | 4/1998 |

OTHER PUBLICATIONS

PCT International Search Report (Feb. 20, 2001).
PCT International Search Report (May 09, 2000).

* cited by examiner

*Primary Examiner*—Bhavesh M. Mehta
*Assistant Examiner*—Yosef Kassa
(74) *Attorney, Agent, or Firm*—Crowell & Moring LLP

(57) ABSTRACT

The invention relates to a method for relocating objects in images. An object reference is correlated with image values. When the object is partially covered in the image, the image values which are located within the covered area in the image are replaced by grey scale values of the object before the correlation is carried out. A system for relocating objects in images is provided with a camera for filming the image, an imagery storage unit for storing an object reference and an imagery processor for replacing grey scale values which are located within the covered area, whereby said grey scale values are replaced by grey scale values of the object reference. The inventive system is also provided with a correlation unit which correlates the image with the object reference, whereby the image has been changed by the imagery processor.

5 Claims, 1 Drawing Sheet

METHOD AND SYSTEM FOR RELOCATING HIDDEN OBJECTS IN IMAGES

This application claims the priority of German patent document 199 02 681.5, filed 23 Jan. 1999 (23.01.99) and PCT International Application No. 99/DE99/04064, filed 22 Dec. 1999, the disclosure of which is expressly incorporated by reference herein.

BACKGROUND AND SUMMARY OF THE INVENTION

This invention relates to a method and apparatus for locating or rediscovering partially obscured objects in images, by correlation of an object reference with image values.

Numerous practical uses require objects to be automatically rediscovered in images or digital image sequences. But it can happen that parts of the object are covered up or obscured by obstructions in the field of view.

In a known process for rediscovery of objects in images, the object image to be located stores a reference and that reference is subsequently correlated with the image within a limited range. Only part of the reference is used during correlation and the image pixels of that reference belong to the object. Parts that do not belong to the object are masked by object windowing or object masking. The location of the correlation maximum supplies the current position of the object in the image, because the image pixels there agree with the object pixels.

This known process however is problematic in that the correlation no longer provides the correct position of the object when it happens to be partly covered up, because one correlates in the covered area with image pixels that do not belong to the object. Due to this coverup, only part of the object is compared to the reference, which leads to an inaccurate recognition of the object or of the position of the object. Imprecise recognition of the coverage area very quickly yields an erroneous object position in the image.

It is therefore a purpose of the present invention to provide a process for rediscovering objects in images, which will facilitate precise recognition and precise determination of the object position.

Another object of the invention is to provide a system for the rediscovery of objects in images, with which the object position can be determined precisely.

These and other objects and advantages are achieved by the method and apparatus for rediscovery of objects according to the invention, which includes a correlation of an object reference with image values. If an object is partially obscured (covered up), the image values that are within the coverage area in the image, are replaced by gray values of the object or of an object reference, before the correlation is performed. In that way, the errors connected with the rediscovery of the object are significantly reduced.

As part of this process, a reference image is preferably subjected to interference windowing in order to replace the image values within an interference mask by the gray values of the object. Advantageously, the reference image is subjected to object windowing in order to get the object reference.

In the present invention, especially prior to coverup, an image of the complete object is stored, and is used to determine the position of the object in case of a partial coverup. Advantageously, covered parts of the object in the image are replaced by parts of a stored reference.

The invention-based system for the rediscovery of objects in images includes a camera to take a picture, an image data memory to store an object reference, an image data processor to replace gray values that lie in the image within a coverup area with gray values of the object reference, and a correlation unit that correlates the image—altered by the image data processor—with the object reference. The invention-based system is able precisely to recognize the coverup area and to determine a precise object position in the image. Errors are avoided or substantially reduced in that the already stored information on the appearance of the object is employed.

The invention is guided by a basic cybernetic idea: the system stores the image of the complete object and uses this information to determine what is behind the coverup. This technique is patterned after the human observer, who remembers the image of the complete object and who has an idea of what is behind the coverup. As a result, one can determine precisely the position of the object in case of partially covered objects.

Other objects, advantages and novel features of the present invention will become apparent from the following detailed description of the invention when considered in conjunction with the accompanying drawings.

DETAILED DESCRIPTION OF THE DRAWINGS

Figure 1:
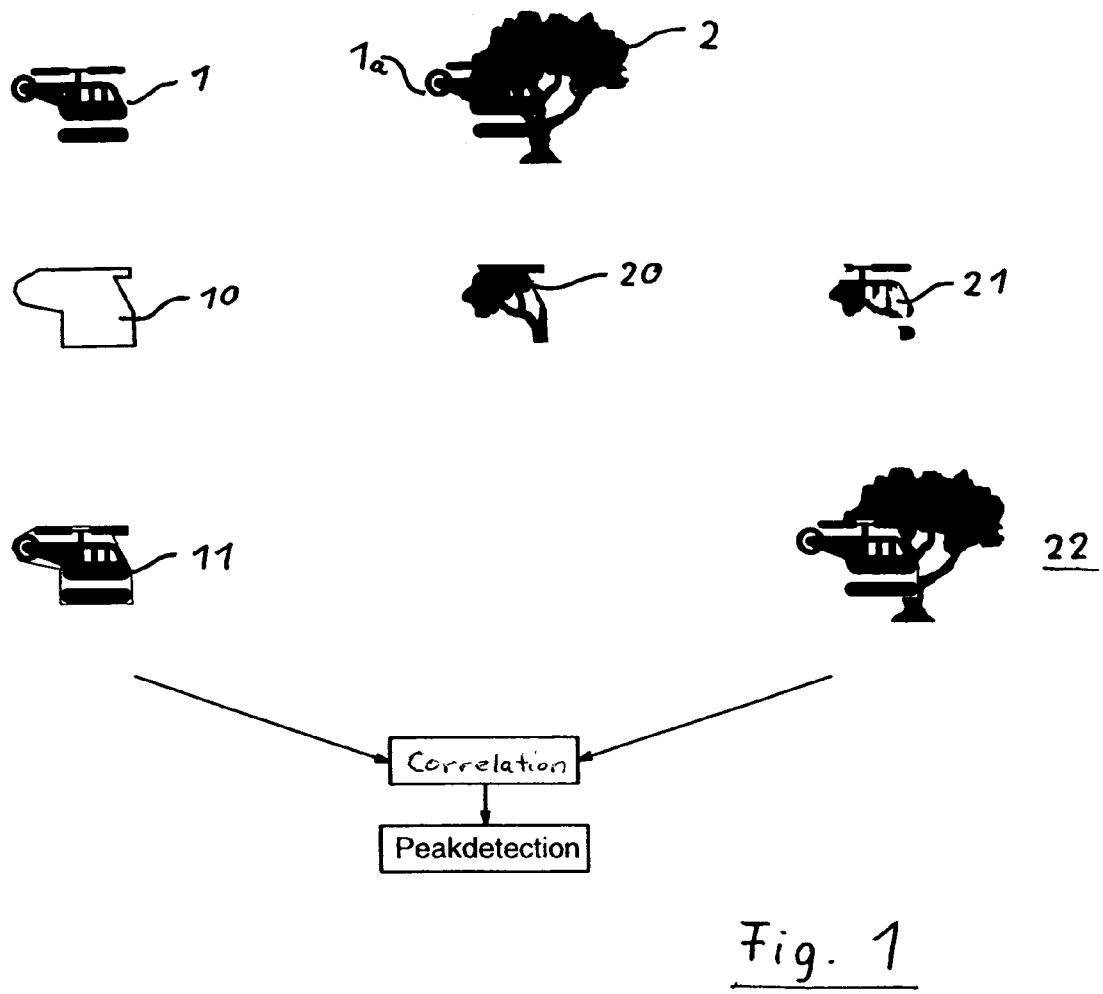
FIG. 1 graphically illustrates the individual steps of the invention-based process.

FIG. 1 shows the steps of the invention-based process by way of example, on the basis of target tracking. The target or object 1 is initially visible, but as time goes on, it disappears behind an obstruction 2, which covers it up. At a certain point in time, one or more parts 1a of object 1 can still be recognized, while the remaining parts of object 1 are behind the obstruction 2. If a picture is taken at that point in time, it contains object 1 which is partially covered by obstruction 2.

From a known reference image, which contains the target or object 1, an object mask 10 is produced. Object mask 10 is superimposed with the picture that was taken and that contains target 1 behind obstruction 2. This can be done so long as part 1a of object 1 can still be seen in the image. By superpositioning object mask 10 with the partially obscured object and the obstruction, an interference mask 20 is created, which is superposed on obstruction 2. That is, interference mask 20 consists of those parts of the obstruction 2 that cover the remaining parts of the object 1 in the image.

By means of an image data processor, the image pixels inside interference mask 20 are replaced by the gray values of object 1 that are taken from the reference image. This results in a replacement 21 with image pixels that correspond to just the covered parts of object 1. Replacement 21 is then inserted in the picture that was taken in the area of interference mask 20 so that the image now generated contains the complete object 1, without any parts of object 1 missing. The image, thus generated with the help of the image data processor, forms a foundation for further procedural steps.

From the stored reference image (that, as described above, contains object 1), a reference or object reference 11 is created, with the help of object mask 10. Object reference 11 is now correlated with image 22 that contains replacement 21. The correlation maximum is determined by means of a peak detection. The location of the correlation maximum thus supplies the precise position of object 1 in the picture.

Figure 2:
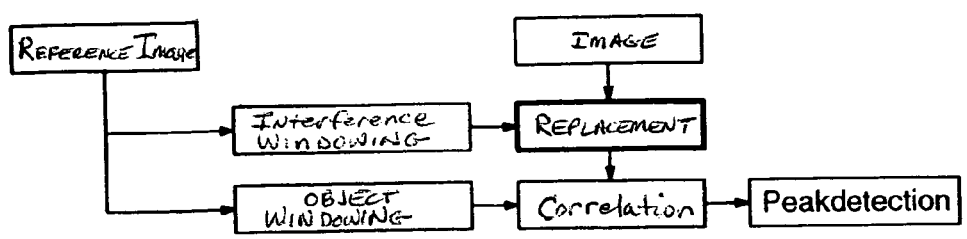
FIG. 2 is a flow chart of the invention-based process.

FIG. 2 is a block diagram which shows the process for the automatic location or rediscovery of object 1 in the picture that was taken. The data of a reference image 201 are subjected to interference windowing 202, and those image parts 203 in which the object is behind the obstruction are replaced with the gray values of the object from the reference image in block 204. The reference image is also subjected to object windowing 205 that, as a result, supplies the object reference. In a correlation unit 206, the object reference is correlated with the image that contains the replacement from block 204. Finally, in order to determine the correlation maximum and the position of the object, a peak detection 207 is performed. (In the process, the reference image for example is a previously taken picture that contains object 1.)

In the method and apparatus according to the invention, in the search area of the image, the gray values of the obstruction are replaced by the gray values of the object; as a result, considerably increased precision of recognition and position determination of objects is achieved. Moreover, there is considerably less intervention in the signals that are subject to correlation than during the out-masking of entire image portions. Errors during position determination are reduced considerably by storing the previously obtained information on the appearance of the object and by using this information to find the object behind an obstruction.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A process for determining location of an object in an image by correlation of an object reference with image values, wherein:

in case of a partial obstruction of an object in a coverage area within the image, image values that lie within the coverage area are replaced by gray values of the object, before correlation is performed; and a reference image is subjected to interference windowing in order to replace the image values within an interference mask with gray values of the object.

2. The process according to claim 1, wherein the reference image is subjected to object windowing to obtain an object reference.

3. The process according to claim 1, wherein an image of the complete object is stored, and used to determine the position of object in case of a partial coverup.

4. The process according to claim 1, wherein parts of the object that are obscured in the image, are replaced by parts of a stored reference.

5. Apparatus for locating an object in an image, comprising:

a camera for taking a picture;

an image data memory to store an object reference;

an image data processor programmed to replace gray values that are within an obscured area in the image, with gray values of the object reference; and a correlation unit that correlates the image, altered by the image data processor, with the object reference;

wherein in case of a partial obstruction of an object in a coverage area within the image, image values that lie within the coverage area are replaced by gray values of the object, before correlation is performed; and a reference image is subjected to interference windowing in order to replace the image values within an interference mask with gray values of the object reference.

* * * * *